Fig.1

April 25, 1950  N. M. MARSILIUS  2,505,643
PIN MACHINE

Filed July 26, 1945  5 Sheets-Sheet 2

Fig. 2

INVENTOR
Newman M. Marsilius
BY
John P. Hanrahan
ATTORNEY

April 25, 1950 N. M. MARSILIUS 2,505,643
PIN MACHINE

Filed July 26, 1945 5 Sheets-Sheet 5

INVENTOR.
Newman M. Marsilius
BY
ATTORNEY

Patented Apr. 25, 1950

2,505,643

UNITED STATES PATENT OFFICE 2,505,643

PIN MACHINE

Newman M. Marsilius, Trumbull, Conn.

Application July 26, 1945, Serial No. 607,202

14 Claims. (Cl. 82—3)

This invention relates to new and useful improvements in automatic machines and has particular relation to a machine for making dowel pins and the like.

An object of the invention is to provide a machine, automatic in its operation, for the rapid production of dowel pins.

Another object of the invention is to provide a machine for the purpose indicated and which includes means for producing a plurality of dowel pins simultaneously.

A further object is to provide a machine of the character indicated and wherein the various operations are controlled by cams mounted on a single cam shaft.

Other objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims.

In the drawings:

Fig. 7ᵃ is a front elevational view of the same;

Fig. 8ᵃ is a front elevational view of the same;

Figure 2:
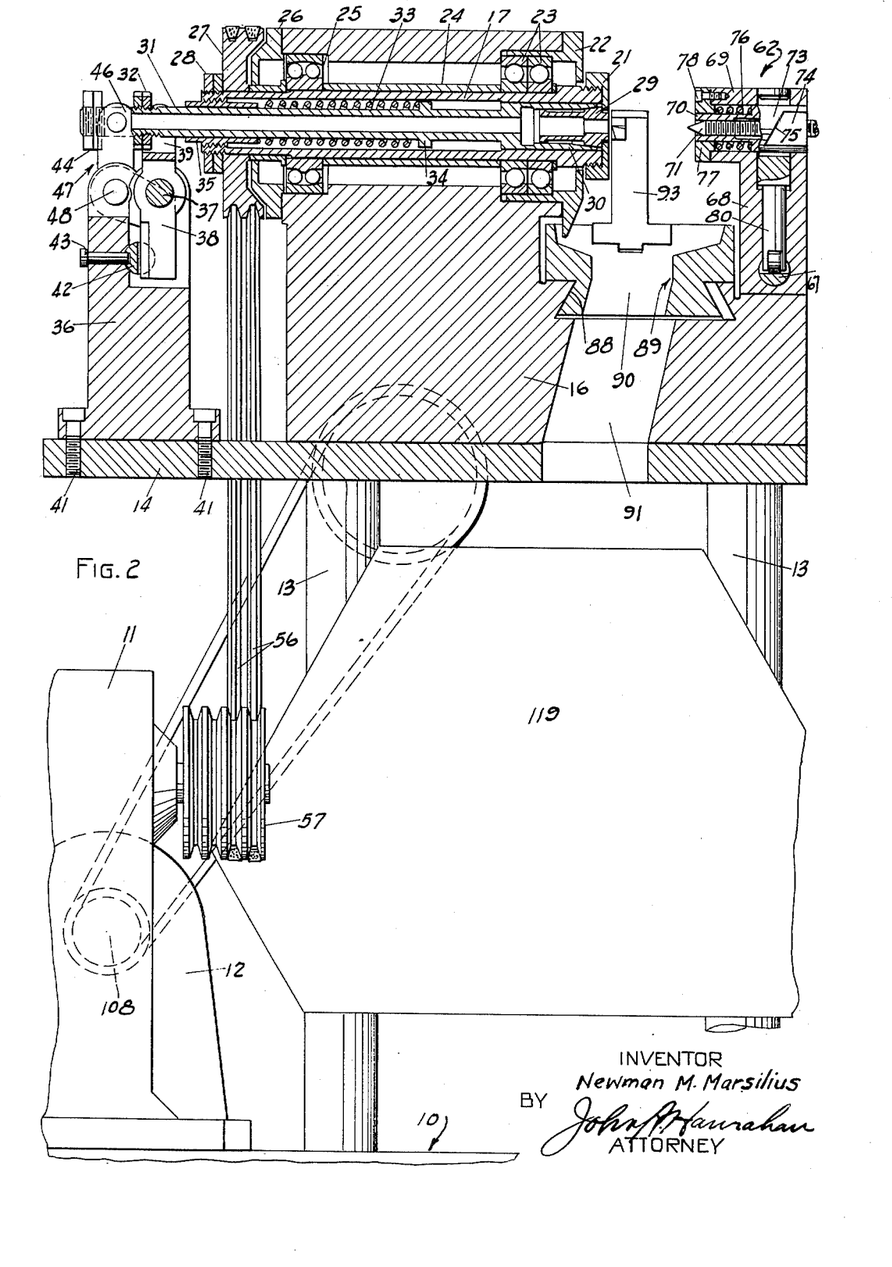
Fig. 2 is a sectional view taken as along the plane of the line 2—2 of Fig. 1.

Referring in detail to the drawing, the machine of the invention includes a base 10 (Fig. 2) on which are mounted motors 11 and 12 and from which extend uprights or posts 13 at their upper ends supporting plates 14 and 15. Disposed on the upper sides of said plates is a bed 16.

Mounted in the upper part of the bed 16 are four spindles comprising a pair of spindles 17 and 18 and a second pair of spindles 19 and 20. The mounting of the spindle 17 and the parts associated with such spindle are shown in section in Fig. 2 and while a detailed description of this spindle follows, it will be understood that the other spindles are substantially duplicates of what will be described.

Spindle 17 extends entirely through the upper portion of the bed 16 and at its forward end is equipped with a nut 21 cooperating with a means 22 for excluding dust from anti-friction bearing means 23 and a sleeve 24 surrounding the spindle. Toward the rear end of the bed anti-friction bearing means 25 supports the spindle and a dust excluding means is provided at 26 on the rear portion of the sleeve 24.

The spindle itself extends beyond sleeve 24 and the nut or the like 26 and has a pulley 27 mounted on its exposed portion. As here disclosed nuts 28 secure the pulley in place although any means may be provided for this purpose. Located in the forward end of spindle 17 is a collet 29 surrounded by the headlike portion 30 of a tubular collet bar 31 extending beyond the rear end of the spindle and there provided with an enlargement here shown as constituting nuts 32. Within the spindle, a coil spring 33 surrounds the bar 31 and at one end bears against the shoulder or enlargement 34 of said bar and at its other end against a sleeve-like stop device 35 threaded or otherwise fixed to the spindle 17. Spring 33 is constantly urging the bar 31 forwardly in a manner to cause the headlike portion 30 of such bar to force the collet 29 to a work-gripping condition.

A support 36 to the rear of the bed 16 mounts a shaft or bar 37 on which is mounted a collet bar operating means or yoke 38 for operating the collet bar 31. This yoke comprises a bifurcated upper portion including a pair of arms 39, each mounting a pin or roller 40. Such pins or rollers are located substantially in alignment with and at opposite sides of the rear end portion of the collet bar 31 but at the inner side of the nuts 32. The yoke is adapted for rocking movement on the bar or shaft 37. Support 36 is rigidly secured in place as by machine screws 41 and such support mounts a long cam bar 42 for sliding movement. One or more pins or the like 43 (see Fig. 2) may have their inner ends located in a groove in the cam bar 42 whereby the latter is held against turning movement. The construction and operation of this cam bar will later be more fully set forth.

The spindle 18 is an exact duplicate of the spindle 17 and all parts associated with the spindle 17 are duplicated in connection with the spindle 18 and corresponding numbers have been applied.

The spindle structures 19 and 20 are also exact duplicates of one another and they are, in fact, duplicates of the spindles 17 and 18 with the exception that the spindles 19 and 20 are somewhat longer than the spindles 17 and 18 and at the rear of the machine project beyond the latter spindles. Additionally, the collet bars 31a of spindles 19 and 20 are longer than the collet bars 31 of the spindles 17 and 18. However, such longer collet bars have the same purpose as the collet bars 31.

Figure 1:
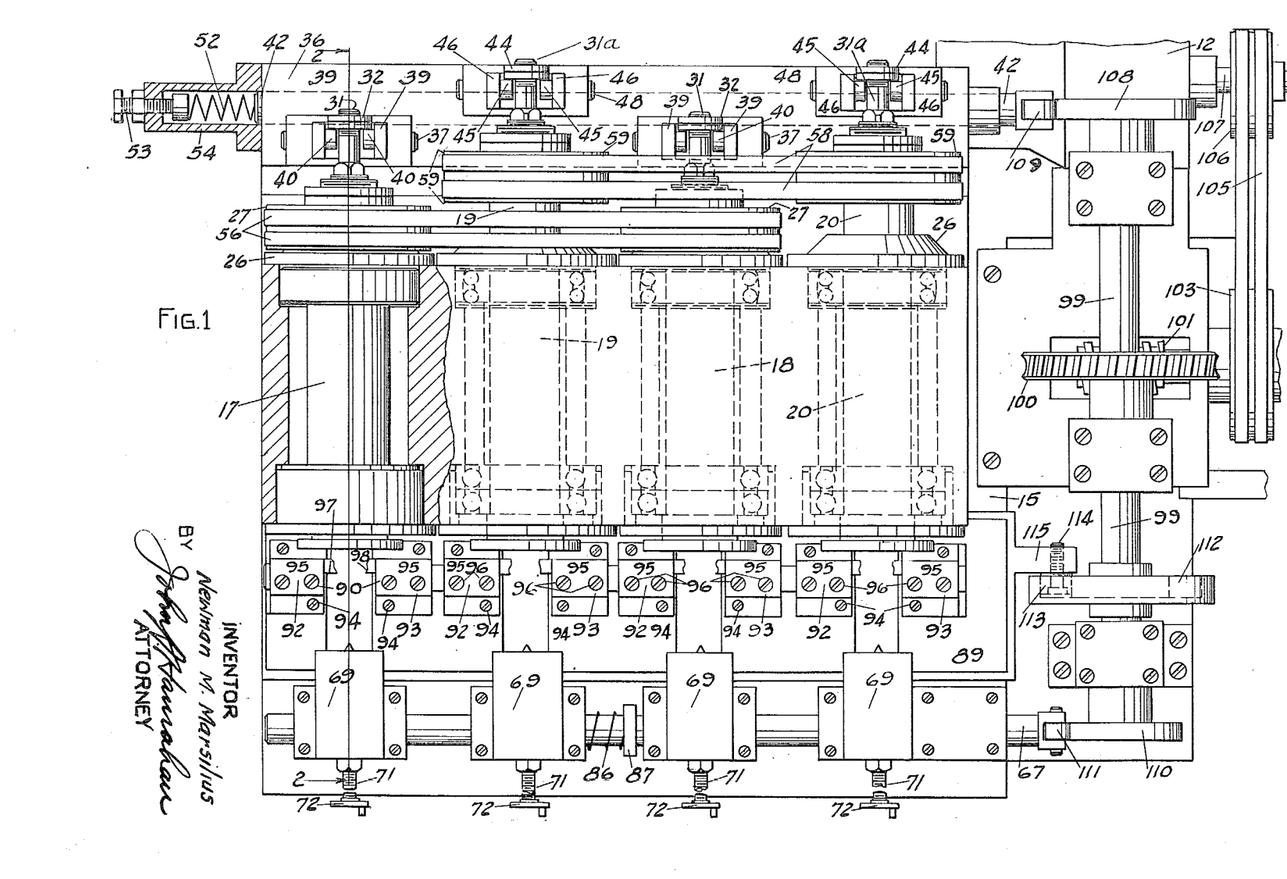
Fig. 1 is a top plan view with parts broken away showing a machine made in accordance with the invention.

As best shown in Fig. 1, the collet bars 31a are at their rear ends equipped with nuts 44 to be engaged by the pins or rollers 45 on the arms 46 of collet bar operating means or yokes 47. Such yokes are mounted for pivotal movement on pins 48 and these yokes 47 are of somewhat different construction in their lower portions from the yokes 38 and, in fact (see Figs. 2 and 8), include intermediate offset portion 49 whereby their lower portions or legs 50 are also disposed at the forward side of the relatively long cam bar 42 above mentioned.

Such cam bar 42 has a series of cam surfaces 51 (see Fig. 4) and one such surface is associated with the lower end portion of each of the yokes 38 and 47. The bar itself is mounted for longitudinal movement and at one end is engaged by a coil spring 52 adapted to have its compression adjusted by means of a screw 53 entering the housing 54 of the spring. The lower end portion of each of the yokes 38 and 47 are bevelled as at 55 with a bevel corresponding to that of the cam surfaces 51.

Figures 4, 5, 7, 7A, 8, 8A:
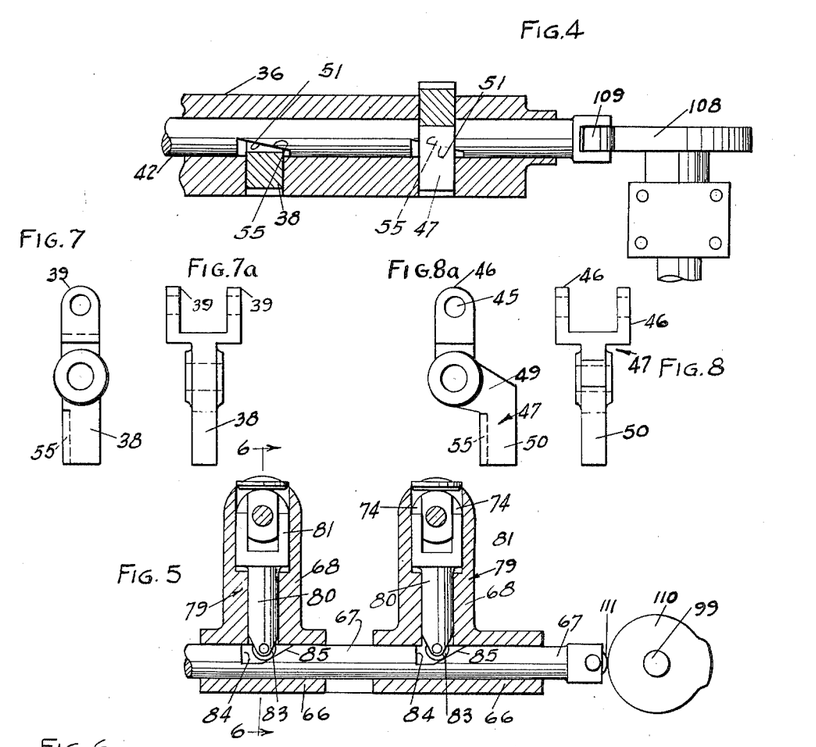
Fig. 4 is an enlarged detail sectional view of the cam bar and associated parts for opening and closing the collets or other work gripping means.
Fig. 5 is an enlarged detail sectional view of a portion of the stop operating cam bar and associated parts.
Fig. 7 is a side elevational view of one type of collet bar yoke employed.
Fig. 8 is a side elevational view of the other type of collet bar yoke employed.

From the foregoing it will be seen that on the cam bar 42 being shifted longitudinally or toward the left in the machine as seen in Figs. 1 and 4, the yokes 38 and 47 will be rocked on their pivots 37 and 48 in a manner to cause the pins or rollers 40 and 45 to draw the respective yoke bars 31 and 31a rearwardly. This withdraws the heads 30 of the respective yoke bars rearwardly with respect to the collets 29 (located in the forward ends of each spindle) so that the collets are permitted to open. Thereafter, on reverse movement of the cam bar 42 the coil spring 33 associated with the respective collet bars are permitted to act to cause the collets to be closed.

Figure 3:
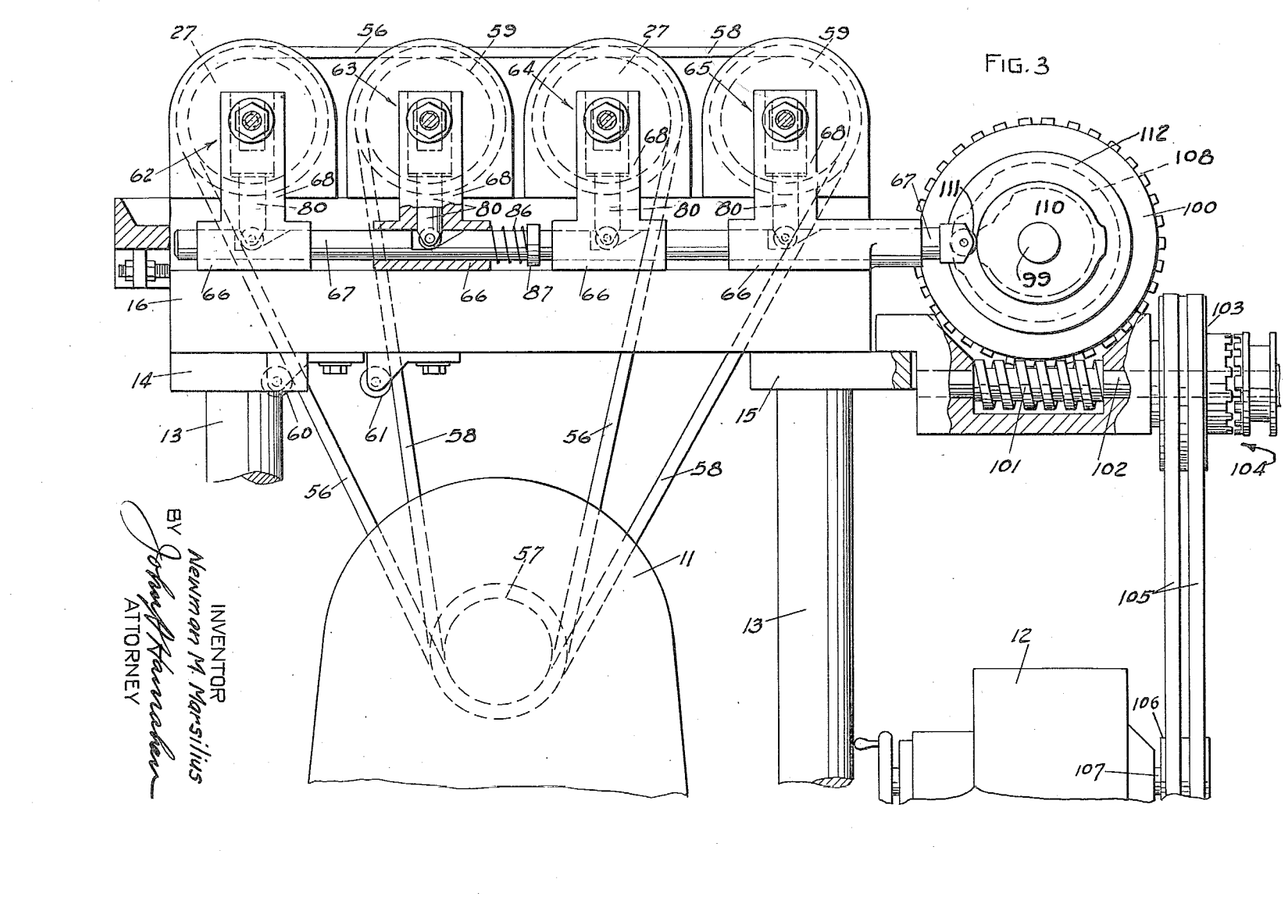
Fig. 3 is a front elevational view of the upper part of the machine, with a portion broken away.

The various spindles may be continuously operated and they are driven in pairs. Thus, belts 56 from the pulley 57 of motor 11 are trained over the pulleys 27 of the spindles 31 while similar belts 58, also from the motor pulley 57, are trained over the pulleys 59 on the rear portions of the spindles 19 and 20. As shown in Fig. 3, the respective pairs of belts 56 and 58 may pass over adjustable idlers 60 and 61 respectively.

On the forward portion of the bed 16 are mounted four substantially similar stop devices, generally designated 62, 63, 64 and 65 respectively. Each stop device includes a base portion 66 having an opening therethrough for a cam bar 67 and further includes an upright portion 68 at its upper end including a headlike portion 69. In each such headlike portion is slidably mounted a sleeve 70 through which is threaded or otherwise adjustably mounted a centering device in the form of a screw 71 pointed at its inner end as shown best in Fig. 2 and at its outer end provided with a hand wheel or other means 72, by which it may be rapidly adjusted.

Figure 6:
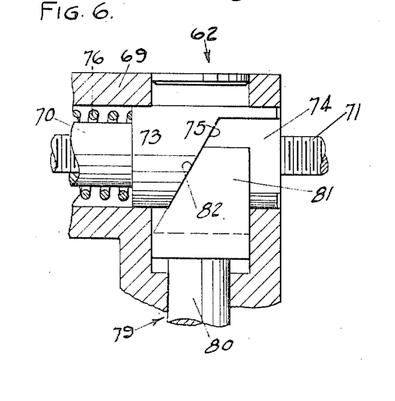
Fig. 6 is an enlarged sectional view at right angles to Fig. 5, as along the line 6—6 of Fig. 5.

Each sleeve 70 also includes a headlike portion 73 flatted on its opposite sides as at 74, and at the inner edge of each such flat inclined or bevelled as at 75 (see Fig. 6). Surrounding the sleeve forwardly of the head 73 is a coil spring 76 bearing at one end against the head of the sleeve and at its opposite end against a gland or collar 77 held in place as by screw 78. Clearly, the purpose of the spring 76 is to normally retain the sleeve and the screw 71 in a retracted position as in Fig. 2. These stop devices are so arranged on the forward upper side of the bed that their respective screws 71 are in alignment with the respective collets 29.

Vertically movable in the postlike parts 68 of the respective stop devices are yoke members 79, each including a vertical part or stem 80 carrying at its upper end a yoke 81, the forward edges or faces of the arms of which are inclined or bevelled as at 82 with an incline or bevel complemental to that at 75 on the heads of the sleeves 70. At their lower ends the posts 80 are each provided with a roller 83 and these rollers are located in recesses 84 in the upper side of the cam bar 67. Such recesses include bevelled portions 85.

Clearly on the cam bar 67 being moved toward the left in the machine as seen in Figs. 1 and 5, the inclined portions 85 of the cam bar being forced under the rollers 83, the yoke members 79 will be forced vertically and due to engagement of the bevel surfaces 82 and 75 of the yoke members and the sleeve head 73 the sleeves 70 will be forced forwardly against the action of the spring 76 and will carry the screws 71 forwardly or toward the collets 29. A coil spring 86 bearing at one end against a stop portion 66 and at its other end against a collar 87 on the cam bar 67 constantly tends to keep the latter toward the right, as viewed in Figs. 1, 3 and 5. A means for operating the cam bar 67 will later be set forth in detail.

Disposed on ways 88 in the upper side of bed 16 is a slide 89. This slide is located in a plane below the collets and stop devices but between such parts and is adapted for sliding movement in directions transverse to the longitudinally center lines of the various spindles 17 through 20. The means for shifting the slide will later be set forth. This slide constitutes a mount for tool posts and at spaced points the slide is provided with openings or slots 90 communicating with slots 91 through the bed 16.

On the upper side of the slide 89 are mounted pairs of tool posts 92 and 93, each such pair being associated with one of the spindles and a corresponding stop means. The respective tool posts are shown as mounted on the slide by machine screws or the like 94 and the respective posts include top plates 95 secured in clamping relation with the tools by means of screws 96. Post 92 in each pair serves to mount a chamfer tool 97 while each post 93 mounts a cutoff tool 98.

The slide 89, the cam bar 42 and the cam bar 67 are all controlled or operated from a single cam shaft 99. This shaft is mounted at one end of the machine in parallel relation with the various spindles 17 through 20 and has secured to it a worm gear 100 meshing with a worm 101 on the shaft 102 with a pulley 103. A clutch device 104 is provided for connecting pulley 103 to and disconnecting such pulley from the shaft 102. This pulley is driven as by means of belts 105 trained also over a pulley 106 on the shaft 107 of motor 12. Pulley 103 is turnable about the shaft 102 but may be coupled therewith at will on operation of the clutch means 104.

Mounted on the rear end of cam shaft 99 is a cam 108 against which bears a roller 109 on the inner end of the cam bar 42. On the forward end of shaft 99 is located a cam 110 against which bears the roller 111 of the cam bar 67. Intermediate worm gear 100 and cam 110, a path cam 112 is fixed to the shaft 99 and receives a roller 113 carried by a stud 114 fast with a luglike extension 115 of the slide 89. Cam 108 serves to shift the cam bar 42 so as to rock the collet bar yokes 31 and 31a in directions to withdraw the collet bars 31 and 31a and release the collets 29. Coil spring 52 providing the return movement for cam bar 42 serves to keep the roller 109 constantly engaged with the cam 108.

Cam 110 serves to impart the operating stroke or movement to the cam bar 67 so as to raise the yoke device 79 and project the stop screw 71 while the coil spring 86 about such cam bar serves to constantly urge the same toward a normal or retracted position and to keep the roller 111 in engagement with the cam 110. The path cam 112 serves to impart positive movement in both directions to the slide 89.

The cycle of operation of the machine may be described as comprehending seven steps. Thus, for step one the stop devices are moved to position, then the collet bars are retracted to permit the collets to open, then work is fed forwardly through the collet bars and collets until it engages the respective stops, then the collet bars are moved forwardly to close the collets, then the stops are retracted by their respective coil springs 76, then the chamfer tools 97 are brought into engagement with the work, and then the chamfer tools are moved away from the work and the cutoff tools are moved against the work to form a radius and to cut the dowel pins from the stock.

Figure 12:
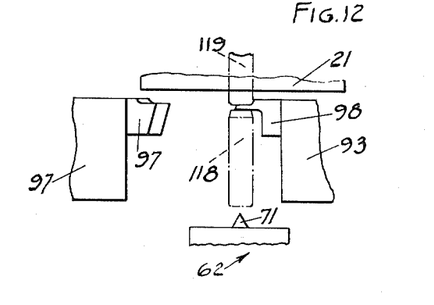
Fig. 12 is a similar view but showing the other tool in use, making the dowel pin radius and cutting the pin off from the stock.

Referring more in detail to the operation, stock is supplied to the various collets through the tubular collet bars 31 and 31a. Preferably, the stock which may comprise various materials but usually comprises bars of metal is normally urged through the collets by airfed means, not shown, but which may be of standard type or of any type desired. In fact, the means employed for feeding the stock is not a part of the invention since means suitable for the purpose may be purchased in the open market. The cutoff tools 98 (see Figs. 9 through 12) in addition to the cutoff portion 116 include a radiusing portion 117. Thus, as best suggested in Fig. 12, as a piece of work 118 is being cut from a bar of stock 119 the portion 117 of a tool 98 serves to radius the forward end of such bar of stock. Now when the piece 118 is cut from the stock, such piece falls through the openings 90 and 91 and may be received in a suitable receptacle or tote box or the like 119, shown in Fig. 2.

Figures 9, 10:
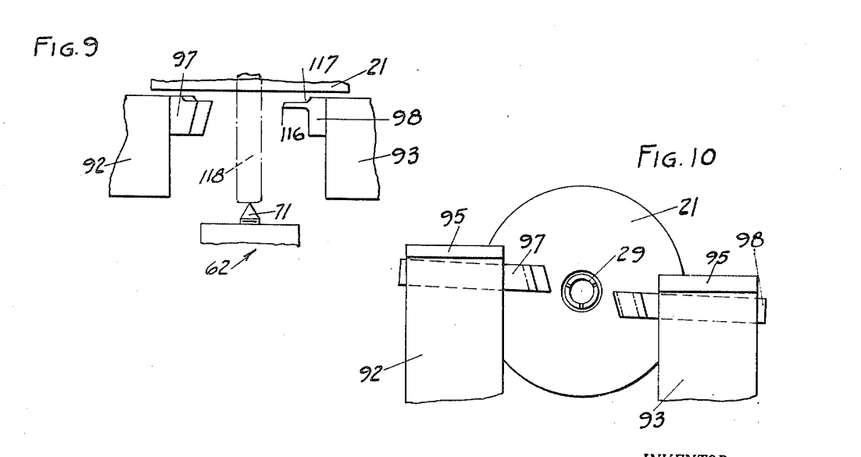
Fig. 9 is a plan view showing the relation of the tools and other parts as when the work is being fed.
Fig. 10 is a front elevational view showing the relationship of the parts at such time.
Figure 11:
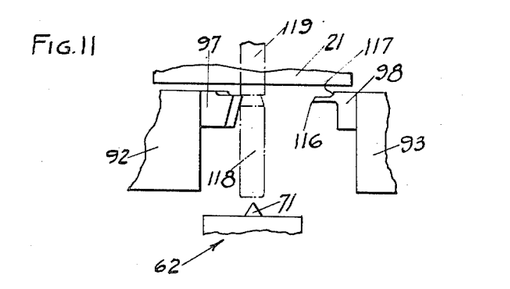
Fig. 11 is a view similar to Fig. 9 but showing the first tool in operation making a chamfer cut.

The timed relation of operation is such that when the piece 118 is completely cut from the stock, the slide 89 is shifted to a position wherein the tools 97 and 98 are substantially equally spaced from the center of the collet as shown in Figs. 9 and 10.

At this time cam 110 shifts the cam bar 67 to project the stop screws 71. Also cam 108 shifts the cam bar 42 to rock the collet bar yokes in a manner to retract the collet bars 31 and 31a to permit the collets to open. Then work is fed forward into engagement with the stop screws and further movement of cam 108 permits shifting of the cam bar 42 by the coil spring 52 so that the collets are closed and grip the work.

Now cam 110 is moved so that the spring 86 may operate to shift the cam bar 67 whereupon the coil spring 76 retracts the stop screws. Now path cam 112 shifts the slide 89 to bring the chamfer tool 97 into engagement with the work as in Fig. 11. At this time, the stops are spaced from the work. Slide 89 is again shifted by the cam 112 to bring the cutoff tool 98 against the work so as to cut a dowel pin from the stock and to radius the forward end of the stock.

It will be appreciated that with the present machine I have an automatic device adapted for the rapid production of dowel pins. Four complete dowel pins are produced for each complete cycle of operation of the machine. Dowel pins or various sizes may of course be produced and in this connection it will be understood that the stop screws 71 are adjusted through the sleeves 70 to project more or less, depending on the length of the dowel pin to be cut. The movement of the cam bar 67 is always to the same extent and so the stop screws are moved a predetermined distance to engage the work being fed and then are retracted for that distance. Thus, the length of the dowel pin being cut depends on the adjustment of the screws 71 through the sleeves.

The motors 11 and 12 include built-in variable speed friction drives. Thus, by adjusting the drives, which are of a commercial type, the speeds of the spindles and the speed of the main cam shaft may be adjusted.

Having thus set forth the nature of my invention, what I claim is:

1. In a machine for cutting dowel pins, a hollow spindle, a collet at the forward end of said spindle, a hollow collet bar in said spindle and shiftable longitudinally thereof between a forward position and a rearward position, said collet bar when in a forward position maintaining said collet in work-gripping condition and when in a rearward position releasing the collet, said collet bar and collet adapted to have work fed therethrough when the collet is released, a collet bar operating means pivotally mounted adjacent the rear end of said collet bar, a reciprocable cam bar engaging an end portion of said means to rock the latter on movement of the cam bar in one direction, a rotary cam for moving said cam bar in said direction, and a connection between said means and collet bar whereby when the means is rocked by the cam bar the collet bar is shifted to a rearward position and said collet released.

2. In a machine for cutting dowel pins, a hollow spindle adapted to have bar stock fed therethrough, a work holder at the forward end of said spindle for gripping a bar of stock; means for opening and closing said work holder, a stop beyond and aligned with said work holder, said stop including a projectable and retractable sleeve and a centering device adjustable through said sleeve, spring means for holding said sleeve in retracted position and for returning it thereto when moved therefrom, a cam bar below said sleeve and having a cam face, a vertically movable yoke above said bar and at its lower end engaging the bar, means to move said cam bar to carry its cam surface under said yoke to raise the latter, and cooperating surfaces between said sleeve and the upper portion of said yoke whereby when the latter is raised said sleeve and centering device are projected toward said work holder.

3. In a machine for cutting dowel pins, a hollow spindle, adapted to have bar stock fed therethrough, a work holder at the forward end of said spindle for gripping a bar of stock, a stop beyond and aligned with said work holder, said stop including a projectable and retractable sleeve and a centering device adjustable through said sleeve, spring means for holding said sleeve in retracted position and for returning it thereto when moved therefrom, a cam bar below said sleeve and having a cam face, a vertically movable yoke above said bar and at its lower end engaging the bar, means to move said cam bar to carry its cam surface under said yoke to raise the latter, cooperating surfaces between said sleeve and the upper portion of said yoke whereby when the latter is raised said sleeve and centering device are projected toward said work holder, and means to open said work holder when said sleeve and centering device are in projected position.

4. In a machine for cutting dowel pins, a hollow spindle adapted to have bar stock fed therethrough, a work holder at the forward end of said spindle for gripping a bar of stock, means for opening and closing said work holder, a stop beyond and aligned with said work holder, said stop including a projectable and retractable sleeve and a centering device adjustable through said sleeve, a cam bar below said sleeve and having a cam face, a vertically movable yoke above said bar and at its lower end engaging the bar, means to move said cam bar to carry its cam surface under said yoke to raise the latter, cooperating surfaces between said sleeve and the upper portion of said yoke whereby when the latter is raised said sleeve and centering device are projected toward said work holder, and spring means for moving said sleeve and centering device to retracted position on reverse movement of said cam bar.

5. A stop including a housing, a projectible and retractable sleeve in said housing, a centering device adjustable through said sleeve, spring means for holding said sleeve and centering device in retracted position and for returning it thereto when moved therefrom, a cam bar below said sleeve and having a cam surface, a vertically movable yoke above said bar and at its lower end engaging the same, means to move said cam bar to shift its cam surface under said yoke to raise the latter, and cooperating surfaces between said sleeve and the upper portion of said yoke whereby when the latter is raised said sleeve and centering device are projected.

6. A stop including a housing, a stop device mounted by said housing, spring means for holding said stop device in retracted position and for returning it thereto on release following movement therefrom, a cam bar below said housing and having a cam surface, a vertically movable yoke above said cam bar and at its lower end engaging the same, means to move said cam bar to shift its cam surface under said yoke to raise the latter, and cooperating surfaces between said stop device and the upper portion of said yoke whereby when the latter is raised said stop device is projected with respect to said housing.

7. In a machine for cutting dowel pins and the like, a hollow spindle adapted to have a bar of work fed therethrough, a work holder at the forward end of said spindle, said work holder adapted to be closed to grip work fed through said spindle and to be opened to permit of work being fed through said spindle, a longitudinally reciprocable means extending substantially parallel with said spindle and adapted on rearward movement relative to the spindle to permit of opening of said work holder and on movement forward relative to the spindle to cause closing of said work holder, an enlargement on the rear end portion of said means, a yoke straddling the rear portion of said means and normally engaging the forward side of said enlargement, a stem rigid with said yoke, a pivot mounting said stem intermediate its ends and thereby pivotally mounting said yoke, a spring normally maintaining said reciprocable means in its forward position with said work holder closed, a cam surface on said stem, a bar, means mounting said bar for reciprocation in the direction of its length and parallel with the axis of said pivot, a cam surface on said bar and engaging the cam surface on said stem, a spring normally maintaining said bar in position with the lower portion of the cam surface of the bar in engagement with the lower portion of the cam surface of said stem whereby the first spring maintains said reciprocable means in its forward position with said work holder closed, and a rotary cam engaging one end of said bar and operable to shift it in the direction of its length against the tendency of said spring to move the high portion of the cam surface of the bar against the high portion of the cam surface of the stem and thereby rock said yoke about said pivot and move said means rearwardly to permit of opening said work holder.

8. In a machine for cutting dowel pins, a series of hollow spindles arranged in substantially parallel relation and each adapted to have a bar of stock fed therethrough, a work holder at the forward end of each spindle for gripping a bar of stock, means for substantially simultaneously opening and closing all of said work holders, a series of stops located beyond and each aligned with one of said work holders, said stops each including a projectable and retractable sleeve and a centering device extending through said sleeve in alignment with its work holder, a bar below and substantially at right angles to all of said sleeves, said bar having a series of cam surfaces located one below each of said sleeves, a series of vertically movable yokes above said bar and each at its lower end engaging one of said cam surfaces, means to move said bar in the direction of its length to carry its cam faces under said yokes to simultaneously raise the latter, cooperating surfaces between the sleeves of said stops and the upper portions of the respective yokes whereby when the latter are raised said sleeves and centering devices are projected toward the respective work holders, spring means for moving said bar in the opposite direction to move said cam faces from under said yokes to permit downward movement of the latter, and spring means for moving said sleeves and centering devices to retracted position on such reverse movement of said cam bar.

9. In a machine for cutting dowel pins, a series of hollow spindles arranged in substantially parallel relation and each adapted to have a bar of stock fed therethrough, a work holder at the forward end of each spindle for gripping a bar of stock, means for substantially simultaneously opening and closing all of said work holders, a series of stops located beyond and each aligned with one of said work holders, said stops each including a projectable and retractable sleeve and a centering device extending through said sleeve in alignment with its work holder, a bar below and substantially at right angles to all of said sleeves, said bar having a series of cam surfaces located one below each of said sleeves, a series of vertically movable yokes above said bar and each at its lower end engaging one of said cam surfaces, means to move said bar in the direction of its length to carry its cam faces under said yokes to simultaneously raise the latter, cooperating surfaces between the sleeves of said stops and the upper portions of the respective yokes whereby when the latter are raised said sleeves and centering devices are projected toward the respective work holders, spring means for moving said bar in the opposite direction to move said cam faces from under said yokes to permit downward movement of the latter, spring means for moving said sleeves and centering devices to retracted position on such reverse movement of said cam bar, said centering devices passing through and threaded to said sleeves, and means at the outer sides of said stops and manually operable to independently thread said centering devices through the respective sleeves whereby to have said centering devices of various effective lengths.

10. In a machine for simultaneously cutting a plurality of dowel pins or the like, a plurality of substantially parallel hollow spindles, a collet at the forward end of each spindle, a hollow collet bar in each spindle and shiftable longitudinally thereof between a forward position and a rearward position, said collet bars when in their forward positions maintaining said collets in work gripping condition and when in rearward positions releasing the collets, springs normally maintaining said collet bars in their forward positions and for returning them thereto when moved therefrom and released, said collet bars and collets adapted to have work fed through them when the collets are released, a collet bar operating yoke pivotally mounted adjacent the rear end of each of said collet bars, said yokes engaging the respective collet bars whereby on rocking of the yokes in one direction on their pivots said collet bars are moved to their rearward positions, a cam bar, means mounting said cam bar for reciprocating movement in the direction of its length, independent cam surfaces spaced along said cam bar and each engaging one of said yokes to rock the latter simultaneously in said one direction on movement of the cam bar in one direction and thereby move said collet bars to their rearward positions, a rotary cam for moving said cam bar in said direction to rock said yokes and move said collet bars to their rearward positions, and means for then moving said cam bar in the opposite direction to permit said springs to return said collet bars to their forward positions.

11. In a machine for simultaneously forming a plurality of dowel pins or the like, a plurality of hollow spindles, a work holder at the forward end of each spindle, said work holders adapted to be closed to grip bar stock and to be opened to permit of feeding of bar stock through them, a stop for each of said work holders and located to limit the feeding of bar stock therethrough, each of said stops including a part having a normal retracted position but adapted to be projected to an advanced position, a slide adapted to have a set of tools thereon for each work holder, a first bar having a separate cam surface for each of said work holders, a second bar having a separate cam surface for each of said stops, said bars arranged parallel with one another and with said slide and reciprocable in the directions of their lengths, means whereby as said cam bars are operated in one direction they operate to open said work holders and project said stop parts to advanced positions, a cam shaft at right angles to said bars, cams on said shaft and operable to move the respective cam bars in said one direction, spring means for thereafter moving said bars in the opposite direction, and a third cam on said shaft and operable to move said slide to carry tools to and from engagement with work gripped by said work holders.

12. In a machine for cutting dowel pins and the like, a series of hollow spindles arranged in parallel relation and each adapted to have a bar of work fed therethrough, a work holder at the forward end of each of said spindles, said work holders adapted to be closed to grip work fed through the respective spindles and to be opened to permit of work being fed through the respective spindles, a longitudinally reciprocable means extending substantially parallel with each of said spindles and each such means adapted on rearward movement relative to its spindle to permit of opening of the work holder of its spindle and on forward movement relative to its spindle to cause closing of the work holder of its spindle, an enlargement on the rear end portion of each of said means, a yoke straddling the rear end portion of each of said means and said yokes normally engaging the forward sides of the enlargements of the respective means, a stem rigid with each yoke, pivots mounting said stems intermediate their ends and thereby pivotally mounting said yokes, springs normally maintaining said means in their forward positions with said work holders closed, a cam surface on each said yoke stem, a bar, means mounting said bar for reciprocation in the direction of its length, cam surfaces on said bar, each of said stems and said bar arranged with the respective cam surfaces of the bar engaging the cam surfaces of the respective stems, a spring normally maintaining said bar in position with the lower portions of its cam surfaces in engagement with the lower portions of the cam surfaces of said stems whereby the first mentioned springs maintain said means in their forward positions with said work holders closed, a rotary cam engaging one end of said bar and operable to shift it longitudinally in one direction against the tendency of said spring whereby to have the high portions of the cam surfaces of said bar ride against the high portions of the cam surfaces of said stems to substantially simultaneously rock all of said stems on their pivots in a direction to move said yokes rearwardly whereby to substantially simultaneously draw all of said means rearwardly against the action of said springs to thereby substantially simultaneously open all of said work holders.

13. In a machine for cutting dowel pins, a hollow spindle adapted to have bar stock fed therethrough, a work holder at the forward end of said spindle for gripping a bar of stock, means shiftable longitudinally of said spindle between a forward position and a rearward position, said means when in a forward position maintaining said work holder closed and when in a rearward position permitting opening of said work holder, said work holder adapted to have work fed therethrough when the work holder is open, a pivoted arm associated with said shiftable means and adapted on pivotal movement in one direction to shift said means rearwardly to permit opening of said work holder, a stop forwardly of and aligned with said work holder, said stop including a projectable and retractable sleeve and a centering device carried by said sleeve, spring means for holding said sleeve in retracted position and for returning it thereto when moved therefrom, a cam bar below said sleeve and having a cam face, a vertically movable yoke above said bar and at its lower end engaging the bar, means to move said cam bar to carry its cam surface under said yoke to raise the latter, cooperating surfaces between said sleeve and the upper portion of said yoke whereby when the latter is raised by said cam bar said sleeve and centering device are projected toward said work holder, a second cam bar having a cam surface engaging a portion of said pivoted means at one side of its pivot, means to move said second cam bar to carry its cam surface against said portion of said means to rock the same on its pivot and shift said shiftable means rearwardly to permit of opening of said work holder, and means whereby said cam bars are moved substantially simultaneously.

14. In a machine for cutting dowel pins, a hollow spindle adapted to have bar stock fed therethrough, a work holder at the forward end of said spindle for gripping a bar of stock, means shiftable longitudinally of said spindle between a forward position and a rearward position, said means when in a forward position maintaining said work holder closed and when in a rearward position permitting opening of said work holder, said work holder adapted to have work fed therethrough when the work holder is open, a pivoted arm associated with said shiftable means and adapted on pivotal movement in one direction to shift said means rearwardly to permit opening of said work holder, a stop forwardly of and aligned with said work holder, said stop including a movable portion projectable to and retractable from the desired stopping position in advance of said work holder, a spring means normally holding said movable portion in retracted position and for returning it thereto when moved therefrom, a vertically movable element located generally below said stop and adapted on being moved upwardly to engage and project the movable portion of said stop to advanced position, a cam bar, a rotary cam to move said cam bar to carry its cam surface under said means to raise the latter and engage and project the movable portion of said stop to advanced position, a second cam bar having a cam surface engaging a portion of said pivoted means at one side of its pivot, and means operable substantially simultaneously with said rotary cam for engaging the second cam bar and moving it to rock said pivoted means about its pivot and move said shiftable means rearwardly to open said work holder.

NEWMAN M. MARSILIUS.

REFERENCES CITED

The following references are of record in the file of this patent:

UNITED STATES PATENTS

| Number | Name | Date |
|---|---|---|
| 320,992 | Woerd | June 30, 1885 |
| 344,926 | Stevens | July 6, 1886 |
| 491,452 | Taylor | Feb. 7, 1893 |
| 621,418 | Jacobs | Mar. 21, 1899 |
| 992,845 | Brochu | May 23, 1911 |
| 1,467,304 | Bosshard | Sept. 11, 1923 |
| 1,594,327 | Rohland | July 27, 1926 |
| 2,373,155 | White | Apr. 10, 1945 |
| 2,377,384 | Slovak | June 5, 1945 |

FOREIGN PATENTS

| Number | Country | Date |
|---|---|---|
| 15,346 | Great Britain | Dec. 14, 1885 |
| 403,957 | Germany | Oct. 9, 1924 |